United States Patent
Erbacher et al.

(10) Patent No.: US 10,584,681 B2
(45) Date of Patent: Mar. 10, 2020

(54) AUTOMATIVE SYSTEM MANAGEMENT

(71) Applicant: ENTIT SOFTWARE LLC, Sunnyvale, CA (US)

(72) Inventors: Peter Erbacher, Boeblingen (DE); Roland Heumesser, Rottenburg (DE); Ulrich Pfeiffer, Boeblingen (DE); Ulf Mueller, Boeblingen (DE); Radi Dimitrov Hadzhiyski, Boeblingen (DE)

(73) Assignee: MICRO FOCUS LLC, Santa Clara, CA (US)

( * ) Notice: Subject to any disclaimer, the term of this patent is extended or adjusted under 35 U.S.C. 154(b) by 257 days.

(21) Appl. No.: 15/531,537

(22) PCT Filed: Dec. 19, 2014

(86) PCT No.: PCT/US2014/071587
§ 371 (c)(1),
(2) Date: May 30, 2017

(87) PCT Pub. No.: WO2016/099558
PCT Pub. Date: Jun. 23, 2016

(65) Prior Publication Data
US 2017/0328344 A1    Nov. 16, 2017

(51) Int. Cl.
*F03D 7/04*    (2006.01)
*G06Q 10/06*    (2012.01)
(Continued)

(52) U.S. Cl.
CPC ............ *F03D 7/048* (2013.01); *F03D 7/047* (2013.01); *F03D 17/00* (2016.05); *G05B 15/02* (2013.01);
(Continued)

(58) Field of Classification Search
CPC .......... F03D 7/048; F03D 17/00; F03D 7/047; G05B 15/02; G06F 11/3006;
(Continued)

(56) References Cited

U.S. PATENT DOCUMENTS

2009/0049338 A1 *  2/2009  Unnikrishnan .... G05B 23/0281
                                                              714/26
2010/0138182 A1    6/2010  Jammu et al.
(Continued)

FOREIGN PATENT DOCUMENTS

| CN | 103901828 A | 7/2014 |
| KR | 20130005856 A1 | 1/2013 |
| WO | WO-2014153673 A1 | 10/2014 |

OTHER PUBLICATIONS

European Patent Office, Extended European Search Report for Appl. No. 14908627.4 dated Apr. 12, 2018 (7 pages).
(Continued)

*Primary Examiner* — Kenneth M Lo
*Assistant Examiner* — Michael W Choi

(57) ABSTRACT

A automative management server for receiving information technology system events and wind turbine events; correlating the information technology system event with the wind turbine event to determine a cause of an event; and generating an alert reporting the cause of the event or taking action to resolve the root cause of the event.

17 Claims, 16 Drawing Sheets

(51) Int. Cl.
  *F03D 17/00* (2016.01)
  *G05B 15/02* (2006.01)
  *G06F 11/30* (2006.01)
  *G06F 11/32* (2006.01)
(52) U.S. Cl.
  CPC ........ *G06F 11/302* (2013.01); *G06F 11/3006* (2013.01); *G06F 11/321* (2013.01); *G06Q 10/06* (2013.01)
(58) Field of Classification Search
  CPC ..... G06F 11/302; G06F 11/321; G06Q 10/06; F05B 2270/301; F05B 2270/303
  USPC ........................................................ 700/287
  See application file for complete search history.

(56) References Cited

U.S. PATENT DOCUMENTS

| | | | |
|---|---|---|---|
| 2010/0138751 A1* | 6/2010 | Kumar | H04L 41/22 715/736 |
| 2011/0054825 A1 | 3/2011 | Perla et al. | |
| 2011/0135473 A1* | 6/2011 | Singamsetti | G05B 23/0272 416/61 |
| 2011/0213590 A1 | 9/2011 | Middendorf et al. | |
| 2012/0010755 A1 | 1/2012 | Stapelfeldt | |
| 2012/0020786 A1* | 1/2012 | Ayres | F03D 7/047 416/1 |
| 2012/0022698 A1* | 1/2012 | Mackay | G06Q 10/06 700/275 |
| 2012/0102144 A1 | 4/2012 | Fritsche | |
| 2012/0143565 A1 | 6/2012 | Graham, III et al. | |
| 2013/0204579 A1 | 8/2013 | Volkmer et al. | |
| 2013/0332399 A1 | 12/2013 | Reddy et al. | |
| 2014/0303935 A1 | 10/2014 | Kamel et al. | |
| 2014/0304201 A1* | 10/2014 | Hyldgaard | G05B 23/0275 706/12 |
| 2017/0139777 A1* | 5/2017 | Gehrmann | H04W 4/70 |
| 2017/0292498 A1* | 10/2017 | Garcia | F03D 7/048 |

OTHER PUBLICATIONS

Kominek D., Case Study: Using OPC Software to Operate1 Wind Farms2 in Spain, (Web Page), Jul. 31, 2014, 8 pages.
Korean Intellectual Property Office, International Search Report and Written Opinion for PCT/US2014/071587 dated Sep. 14, 2015 (12 pages).

* cited by examiner

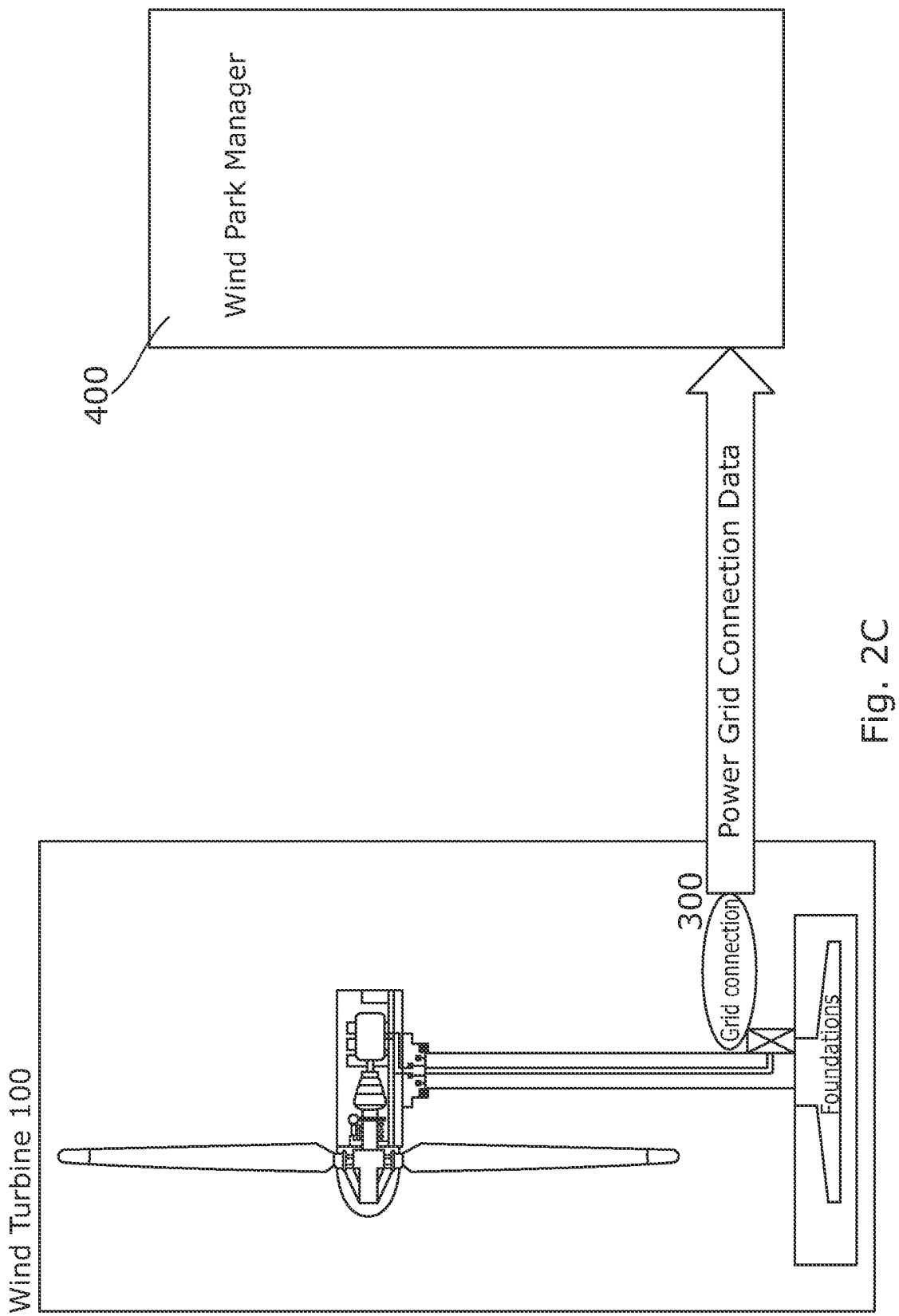

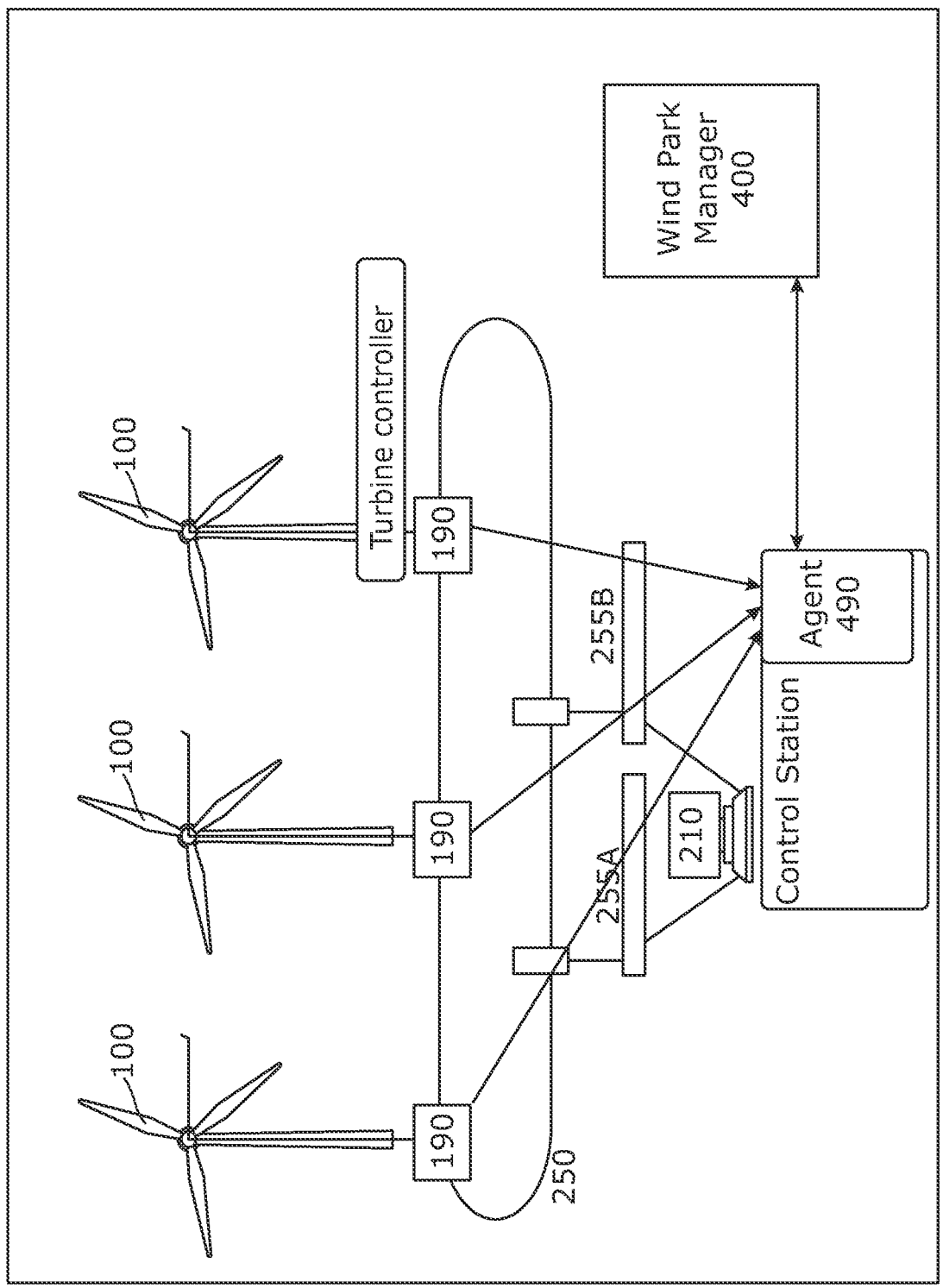

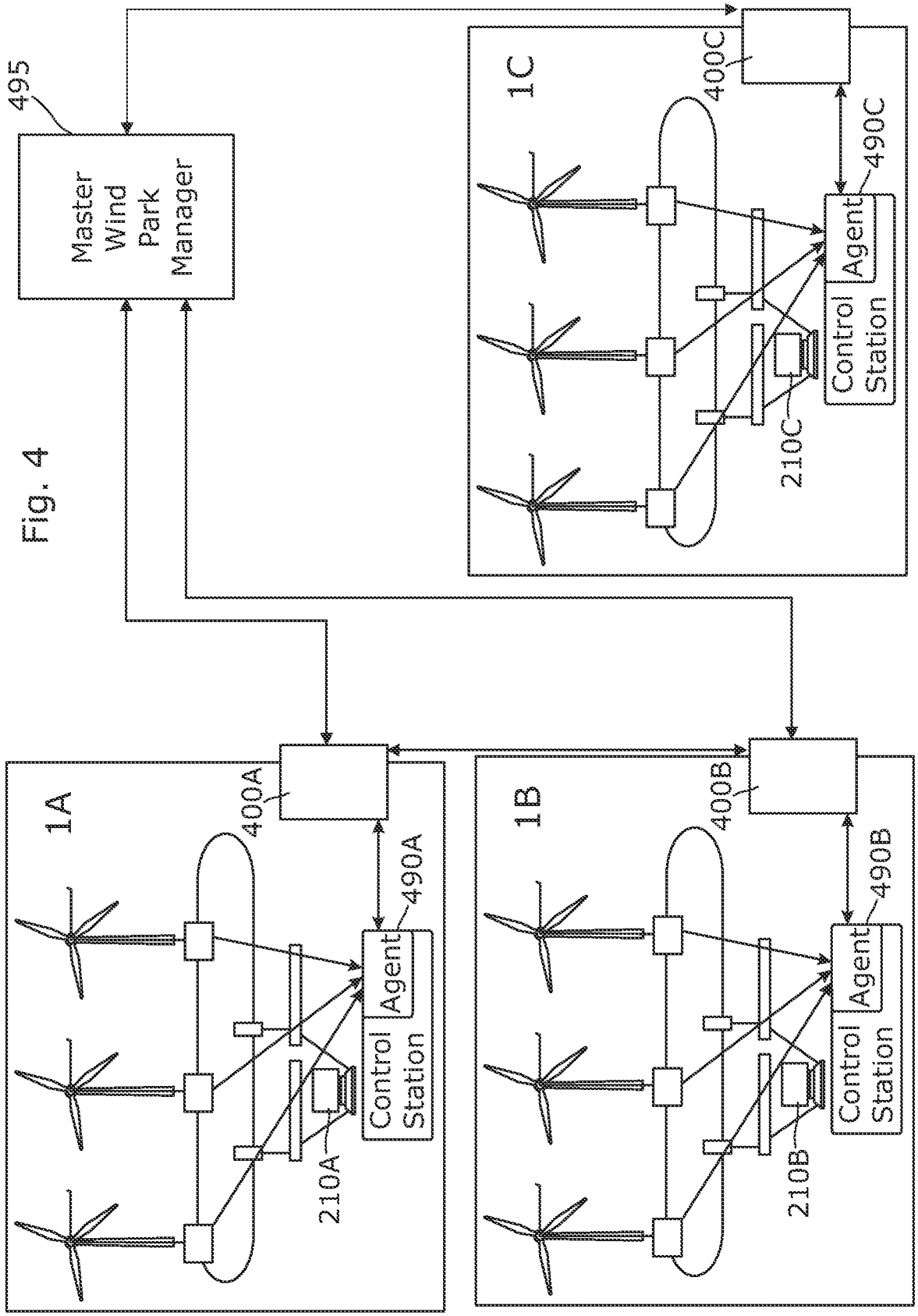

AUTOMATIVE SYSTEM MANAGEMENT

BACKGROUND

An automative system is a system with physical machine components that are electronically controlled or monitored. Many automative systems, such as conveyor belts and robotic arms in factories, or wind turbines in wind parks are managed by an IT system. The IT system may include a central control station, such as computing device, to manage the automative system and a communication network to connect the automative system to the central control station.

A wind turbine may include a turbine controller and condition monitoring systems that monitor various components of the wind turbine. A wind park may include a plurality of wind turbines that are managed by a wind park control station. The wind park control station may be connected to the wind turbines via a communication network.

BRIEF DESCRIPTION OF THE DRAWINGS

Examples of the invention will now be described, by way of non-limiting example only, with reference to the accompanying drawings, in which:

FIG. 2C shows an example of a wind park manager receiving power grid interface data;

FIG. 3C shows an example in which an agent is hosted on the wind park control station and connects directly to turbine controllers;

FIG. 4 shows an example of a manager of wind park managers;

DETAILED DESCRIPTION

The present disclosure relates to an automative system such as a wind park, factory or industrial process. In one example machine events and IT system events are received by a computing device such as a server. As the computing device receives both machine events and IT system events it may build up a fuller picture of the system. For example, the computing device may correlate a machine event with an IT system event to determine a root cause of an event. The computing device may take action to resolve the event or generate an alert reporting the root cause of the event.

In one example the automative system includes a wind turbine in a wind park. This example will be described first, before describing more general application to other automative systems, such as factories or other industrial processes.

Figure 1:
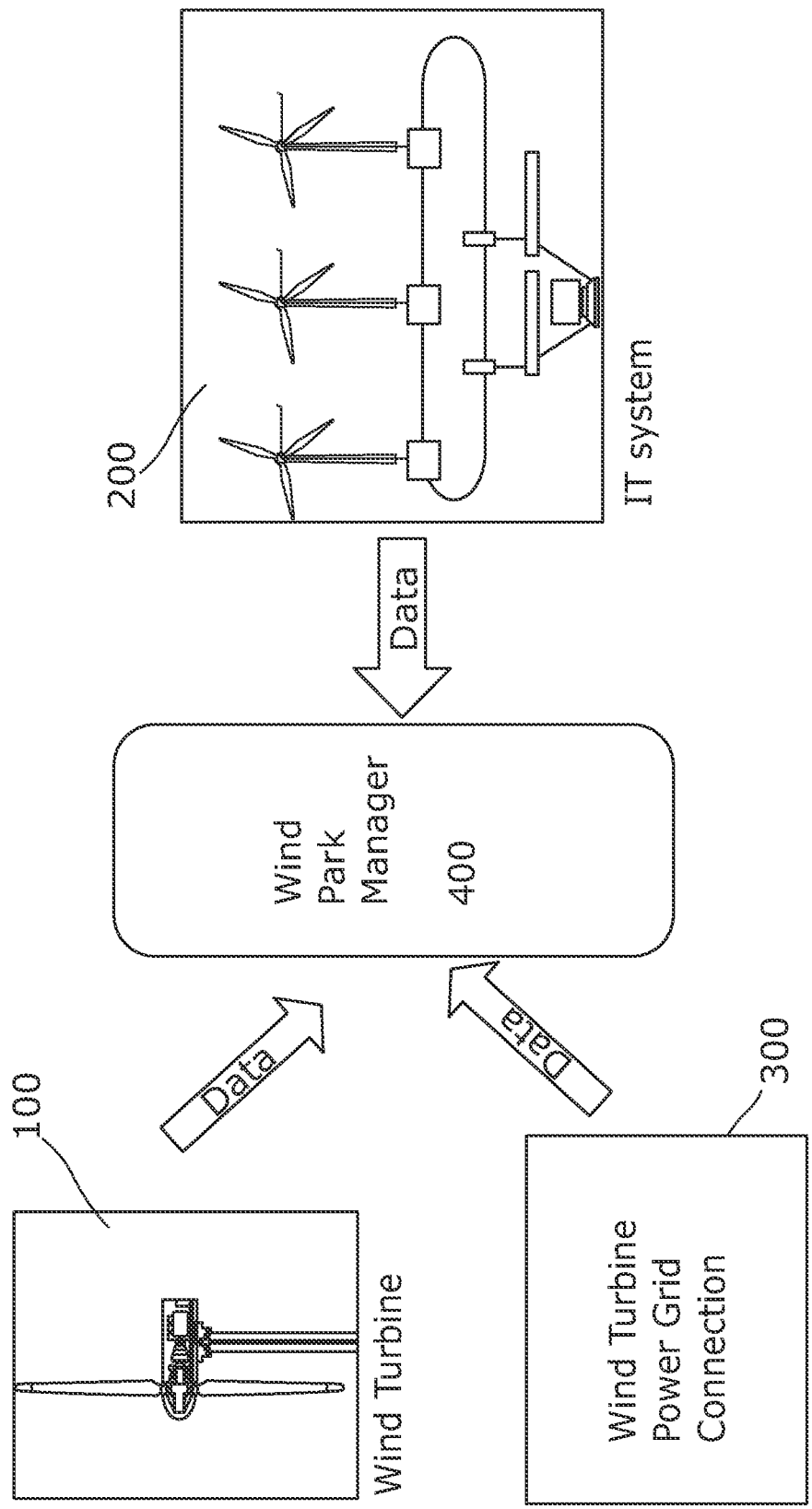
FIG. 1 shows an example of a system according to the present disclosure.

FIG. 1 is a schematic diagram showing a wind turbine 100, an IT system 200, a wind turbine power grid connection 300 and a wind park manager 400. The wind park manager 400 may be hosted on a computing device such as a server. The wind park manager 400 receives data from the wind turbine 100, the IT system 200 and the wind turbine power grid connection 300. The term "receives" includes both active and passive methods, for instance the wind park manager being actively sent by the wind turbine, IT system and power grid connection or the wind park manager retrieving the data by polling the wind turbine, IT system and power grid connection.

Figure 2A:
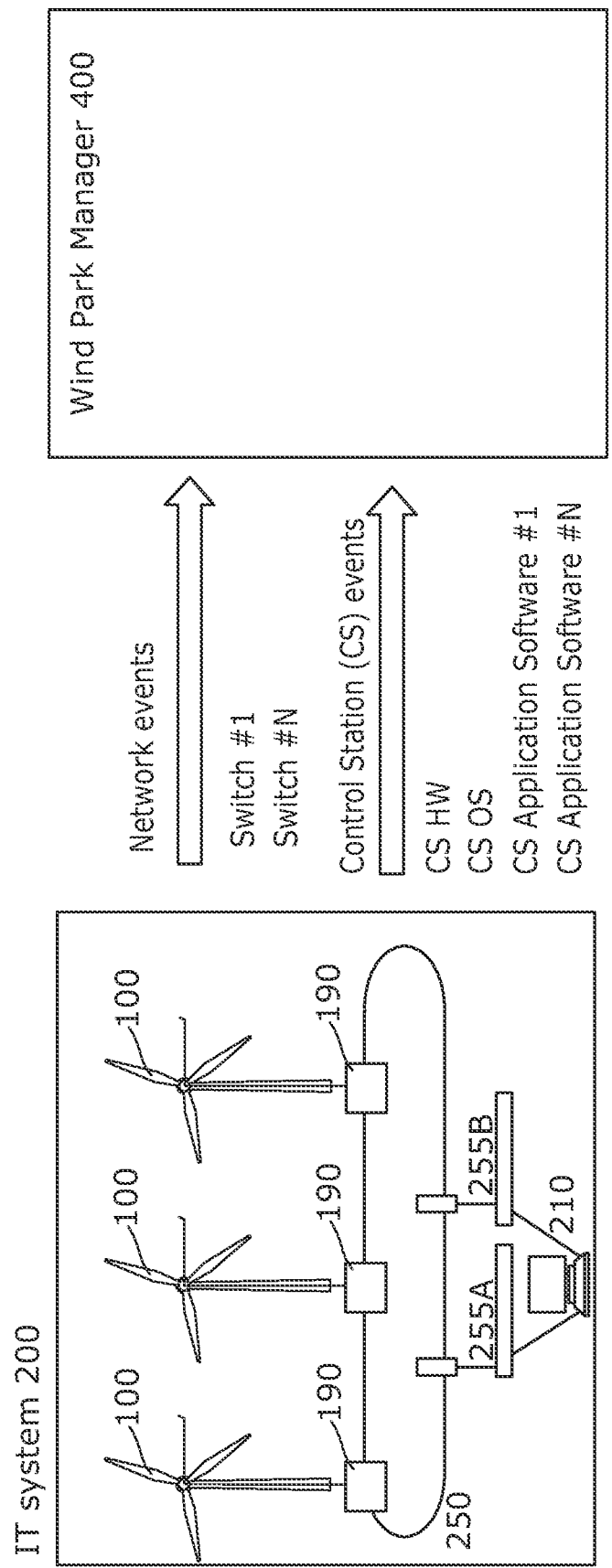
FIG. 2A shows an example of a wind park manager receiving IT system events.

FIG. 2A shows an example of the IT system 200 in more detail. The IT system 200 manages and monitors the wind turbines 100. In this example the IT system includes a wind park control station 210 and a communication network 250 connecting the wind park control station 210 to one or more wind turbines. The communication network 250 may include a plurality of switches 255A, 255B and other network components. The communication network 250 may for example be an Ethernet network or an Internet Protocol (IP) network. The wind park control station 210 is a computer that is connected to and manages one or more wind turbines in a wind park. The wind park control station includes computing device hardware, an operating system and application software for managing the wind turbines. There may be many different modules of application software for managing different condition monitoring systems, controllers and aspects of the wind turbine. In the illustrated example the network 250 connects to the wind turbines 100 via a turbine controller 190 of each turbine and condition monitoring systems of each wind turbine connect to the network 250 via the turbine controller 190. In other examples condition monitoring systems of the turbine may connect directly to the network 250.

The wind park manager 400 receives IT system events. These events may be generated by a component of the IT system and/or may be generated as a result of monitoring of the IT system by an agent of the wind park manager 400, as will be described in more detail later.

An event is a special type of data that indicates a problem or resolution of a problem. An event may include an event type field and an event value. IT system events may for example include network events and wind park control station events. A network event is an event relating to the communication network 250 and may be generated by the switches, other network components or a network management system. A wind park control station event may be an event relating to control station hardware, the control station operating system or any of the software applications hosted on the wind park control station.

Figure 2B:
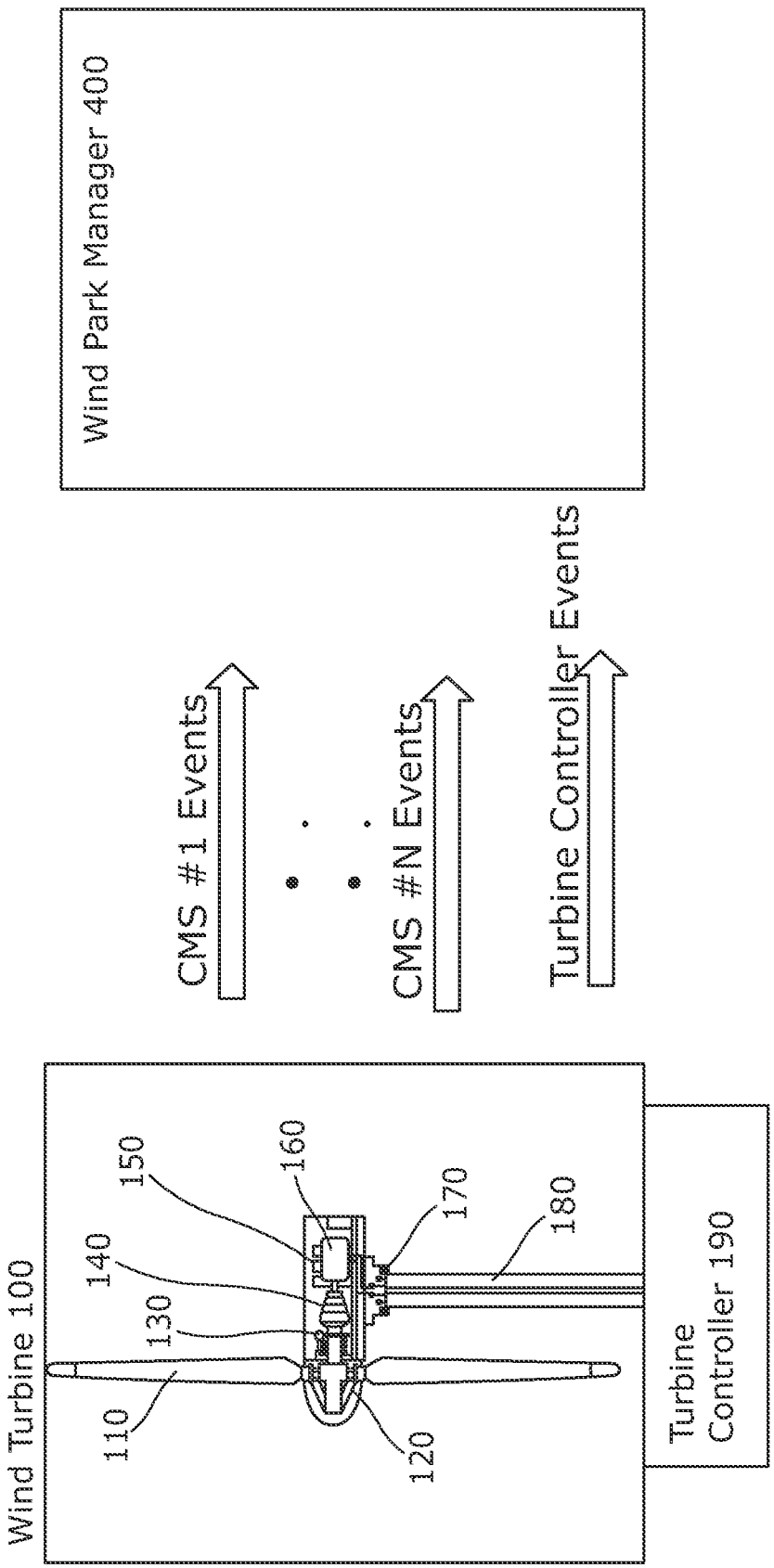
FIG. 2B shows an example of a wind park manager receiving wind turbine events.

FIG. 2B shows an example of the wind turbine 100 in more detail. The wind turbine 100 may include a plurality of machine components such as a rotor blade 110, a rotor hub 120 which may have a blade pitch mechanism, a rotor break 130, a gear box 140, electrical switch boxes 150, a generator 160, a yaw system 170 and a tower 180. Some of the machine components may have their own local controllers. The turbine also includes a turbine controller 190 which is responsible for overall control of the wind turbine. The turbine controller may connect directly to each machine component or to each specialized local controller.

Some or all of the machine components may be associated with respective condition monitoring systems (CMS). A CMS is a system that monitors an automative component. For instance, each CMS may monitor a particular component, parameter or set of parameters such as the blade pitch, rotor speed, temperature of oil in the gear box, pressure of oil in the gear box. In another example, a CMS may monitor the functioning of a local controller that controls a particular component of the wind turbine, for instance a CMS may monitor a controller of the rotor blade pitch mechanism etc.

The wind turbine controller 190 and the local specialized controllers for machine components of the wind turbine may be embedded systems. An embedded system may comprise a processor and a storage medium storing machine readable instructions executable by the processor and a peripheral interface for monitoring or controlling an external device. The wind turbine controller 190 may communicate with the wind park control station 200. The various condition monitoring systems may communicate with the wind park control station 210 directly, or via the wind turbine controller 190.

The wind park manager 400 receives wind turbine events. For example, a wind turbine event may relate to a CMS. For instance a wind turbine event may indicate that the oil temperature is above a certain threshold, that variation in rotor speed is above a certain threshold, or oil pressure is below a certain threshold etc. A wind turbine event may indicate that a previous bad event has been resolved, for instance that oil temperature has reduced to below the previously exceeded threshold. In another example, a wind turbine event may be an event relating to the turbine controller 190. For instance, the event may be a malfunction of the turbine controller or an event generated by the turbine controller.

The wind park manager 400 may receive the wind turbine events passively or actively from a wind turbine or from the wind park control station. The wind turbine events may be generated by a CMS, or by the turbine controller, or they may be derived from data generated by a CMS or turbine controller. For instance, as will be described in more detail later, an agent may gather data from a plurality of CMS and a turbine controller and may process the data to generate events. In some cases an event may be generated due to expected data not having been received. For instance if a hello message from a turbine controller is not received by the wind park control station or the wind park manager in an expected period of time, or if certain expected data is not received from the turbine controller, the wind park control station may generate a wind turbine event.

FIG. 2C shows an example in which the wind park manager 400 receives power grid interface data. The data may be from the interface 300 of the wind turbine to a power grid. The data may for example include electrical power, voltage, phase and frequency levels. The data may be pro-actively sent by a monitor on the turbine power grid interface 300 or may be polled periodically by the wind park manager.

The wind park manager 400 may use an agent 490 to receive data and events from the wind turbines, IT system and power grid interface. The agent 490 may passively or actively receive data and events. The agent may carry out some initial processing of the data and events and may for instance generate an event based on the received data or based on not receiving expected data. As well as events the agent may passively or actively receive metric data indicating performance of an automative system or machine component, for instance the rotations per minute (RPM) of a wind turbine, or electrical power data indicating the electrical power generated etc. The agent may also gather topology data defining the various components of the wind park and their dependencies on each other and make this topology data available to the wind park manager.

Figure 3A:
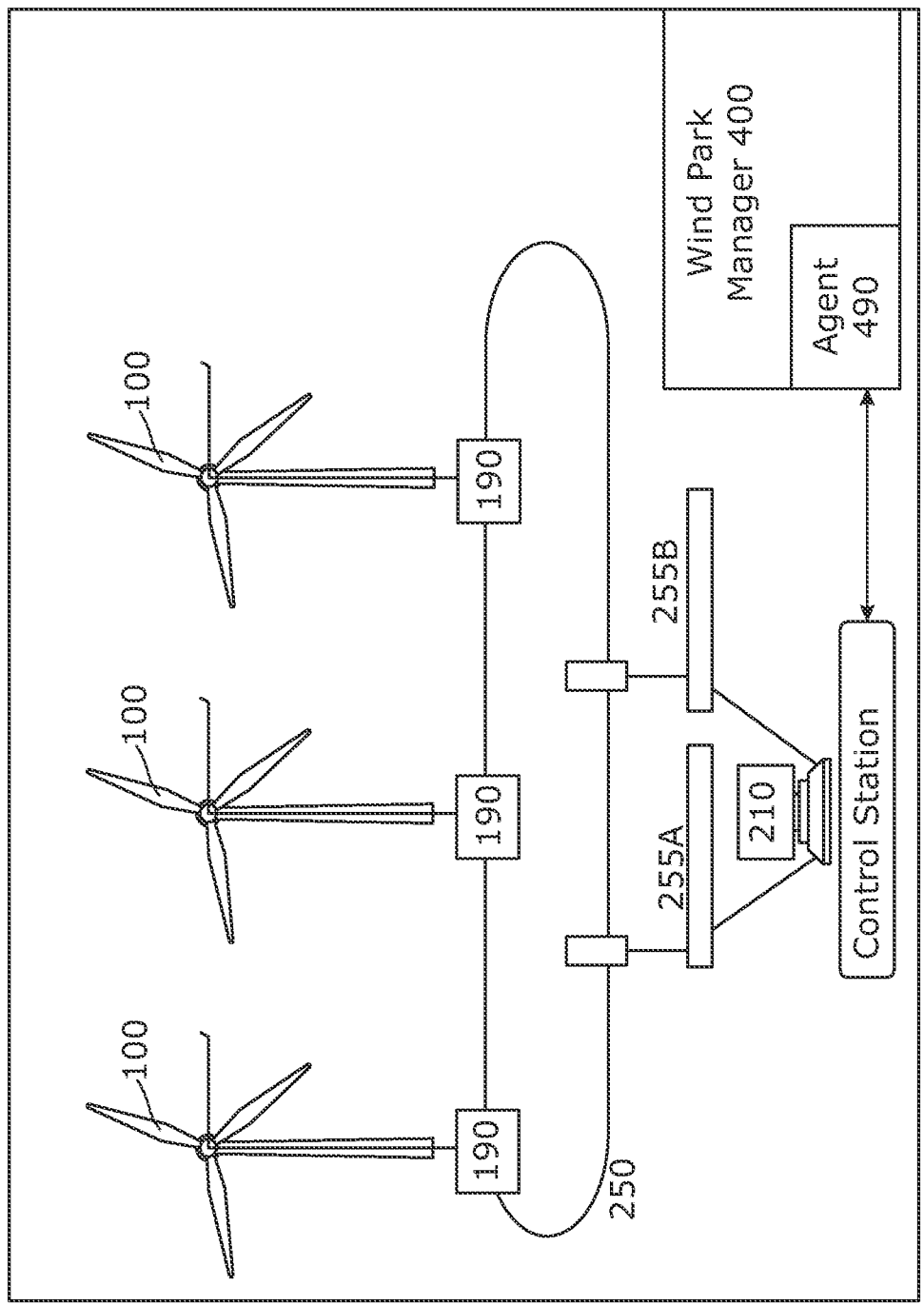
FIG. 3A shows an example in which an agent is hosted outside the wind park control station.

FIG. 3A shows an example in which the agent 490 is hosted on a computing device inside the wind park. For instance the agent may be hosted on its own server or the wind park manager 400. In this example the agent 490 connects to the wind park control station 210 via a network. In this example, the agent 490 may receive data via the operating system of the wind park control station.

The wind park control station may run a plurality of software applications each for receiving data from a particular CMS, turbine controller or power grid connection. There may be a large number of applications if the wind park has turbines from different vendors or if some of the turbines have many independent CMS that connect directly to the wind park control station. The agent connects with these applications to passively or actively receive wind turbine events and data. The agent also remotely monitors the operation of the wind park control station and the network, for instance by receiving heart-beat, stay alive or other messages from the wind park control station operating system, software applications running on the wind park control station, network components, or a network management system.

The agent 490 may translate the data and events into a format understandable by the wind park manager before sending them to the wind park manager 400. In this way the wind park manger is able to gather data from a wide variety of different data sources. Further, in contrast to conventional systems which forward certain turbine data from a wind park control station to a remote server, in the present example the agent also forwards IT system events. In this way if there is a fault in a software application on the wind park control station that gathers data from a turbine controller or CMS, then rather than receiving no data, the wind park manager may receive an IT system event relating to that software application. Thus by sending both wind turbine events and IT system events to the wind park manager, the agent enables the wind park manager to gain a fuller picture of the wind park. Further, as mentioned above, the agent may gather topology information relating to the wind turbines and IT system of the wind park and send the topology information to the wind park manager.

Figure 3B:
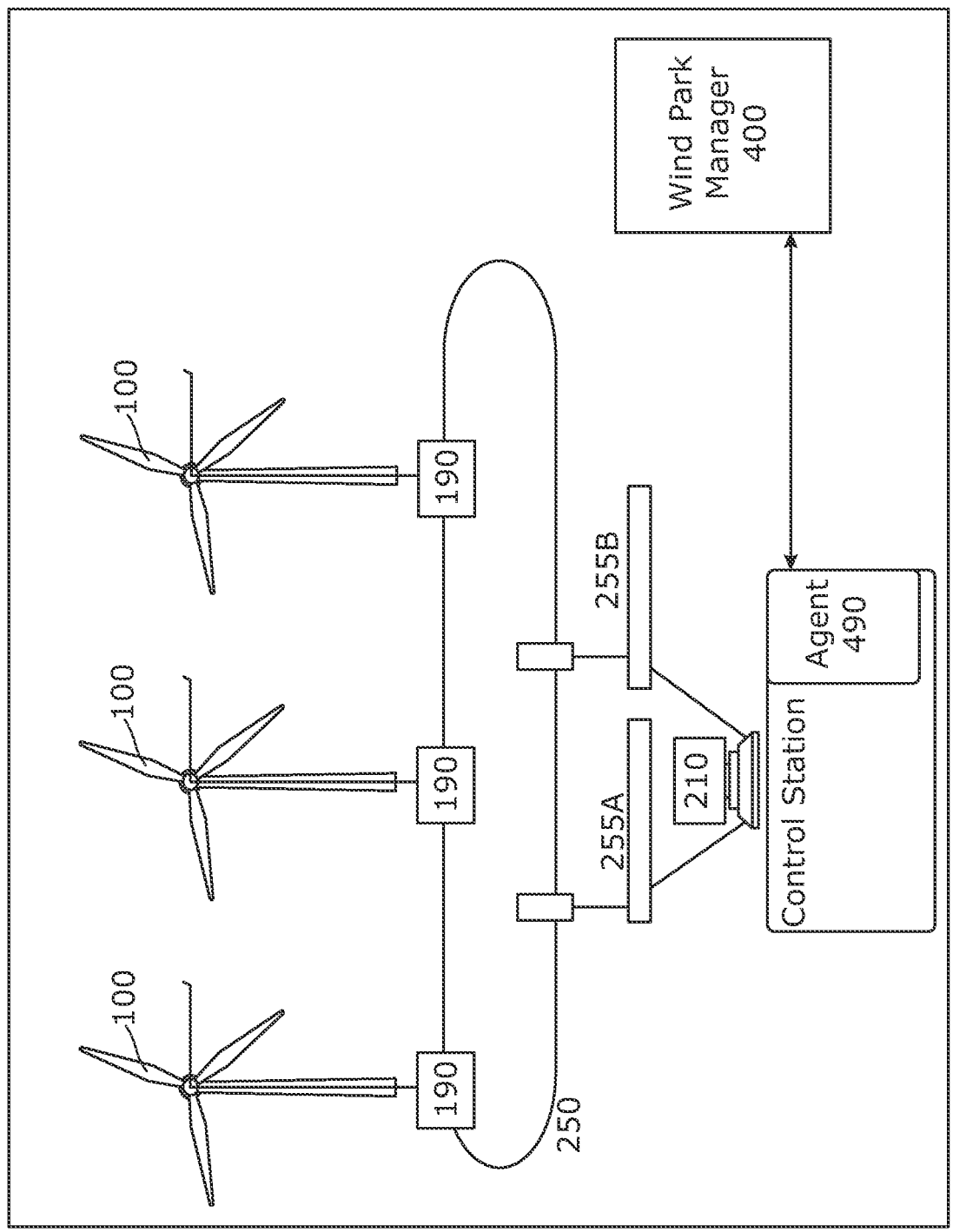
FIG. 3B shows an example in which an agent is hosted on the wind park control station.

FIG. 3B shows an example in which the agent 490 is hosted on the wind park control station. In this example the agent runs as a software application on the wind park control station. The agent may monitor and gather data from the hardware, operating system and other applications running on the same wind park control station, as well as a network management system or components of the communication network. When the agent is hosted on the wind park control station as in FIG. 3B, the agent may have extended data collection capabilities in comparison to a remotely hosted agent as shown in FIG. 3A. For instance in the example of FIG. 3B, the agent may be able to find out which programs are currently running on the wind park control station, whereas this may be more difficult or not possible in the example of FIG. 3A.

FIG. 3C shows an example in which the agent is hosted on the wind park control station 210 as in FIG. 3B, but connects directly to CMS systems and/or wind turbine controllers. The CMS systems and/or turbine controller may send data using a standard format such as UPC UA or the agent may poll the CMS systems or turbine controller. In this way the agent may receive wind turbine data independently of the other software running on the wind park control station. The agent may receive events from the CMS and turbine controller, generate events based on data received from the CMS and turbine controller and/or generate events based on not receiving expected data or messages from the CMS and turbine controller.

FIG. 4 shows an example in which a plurality of wind parks 1A, 1B, 1C each have a respective wind park control station 210A, 210B, 210C and respective wind park manager 400A, 400B, 400C. Each wind park manager 400A, 400B, 400C monitors and correlates events from the IT system and wind turbines of the wind park which it is responsible for. Each wind park manager may receive the events from a respective agent 490A, 490B, 490C. A master wind park manager 495 communicates with and receives and aggregates data from each of the wind park managers in order to facilitate central monitoring and control.

Examples of ways in which wind turbine events, IT system events and power grid interface data are used will now be discussed, before describing the wind park manager 400 in more detail.

Figure 5:
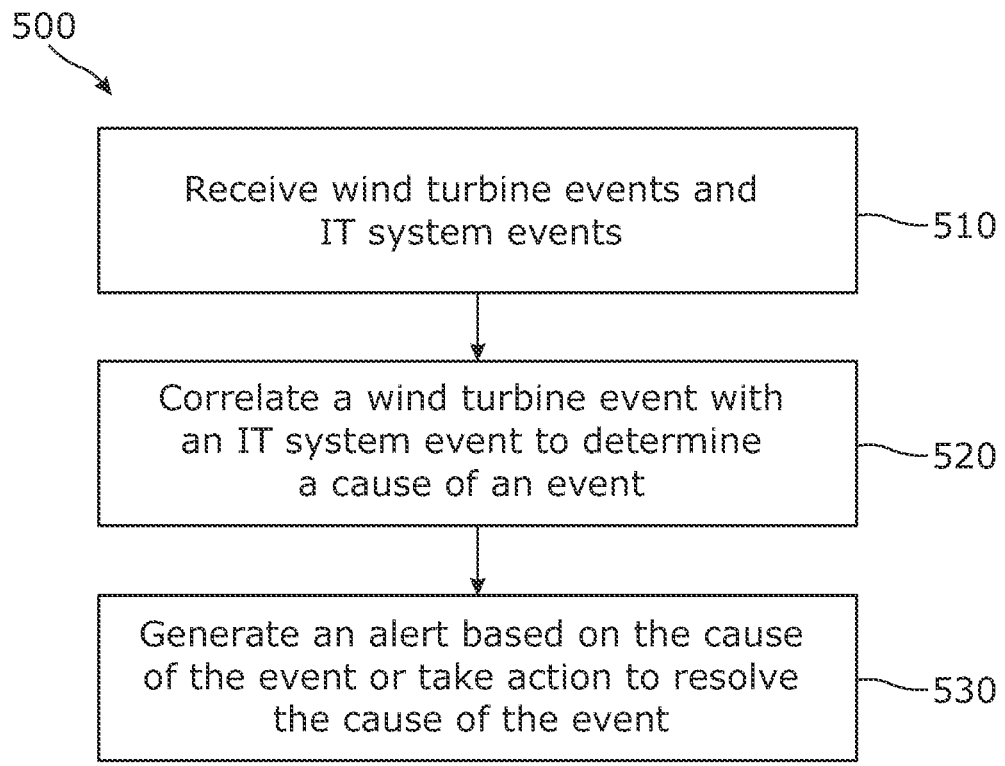
FIG. 5 is a flow chart showing an example method of correlating events.

FIG. 5 shows a method 500 in which wind turbine events and IT system events are received at block 510. The wind turbine events and IT system events may for example be any of the types described above.

At block 520 the wind park manager correlates an IT system event with a wind turbine event to determine a root cause of an event. The root cause of the event is the reason the event occurred. For example, if the wind turbine event was caused by a malfunction in an IT system, the wind park manager may correlate the wind turbine event with an IT system event and determine that the IT system event is the root cause of the wind turbine event. In some cases correlating a wind turbine event with an IT system event may include filtering out events which are deemed not to be a root cause. For instance wind turbine events occurring within a predetermined time window of an IT system event, may be filtered out.

At block 530 the wind park manager generates an alert based on the root cause of the event or takes action to resolve the event. An example of an alert based on the root cause of the event may be an alert to a system administrator indicating the root cause of the event, for instance failure or malfunction of a particular IT system component. An example of action to resolve the event may be re-booting a failed IT system component.

For example, if there is a problem in the communication network, such as a network switch or network link failing, then communication between the wind turbine and the wind park control station may be disrupted. As a result the wind park manager may receive a false wind turbine event. For instance, due to the problem in the communication network a software application on the wind park control station may fail to receive a heartbeat, stay-alive or other message from a wind turbine and thus generate a wind turbine event. By correlation the root cause of a wind turbine event may be determined and an alert generated or action taken to resolve the event. Specific examples will now be described.

Figure 6:
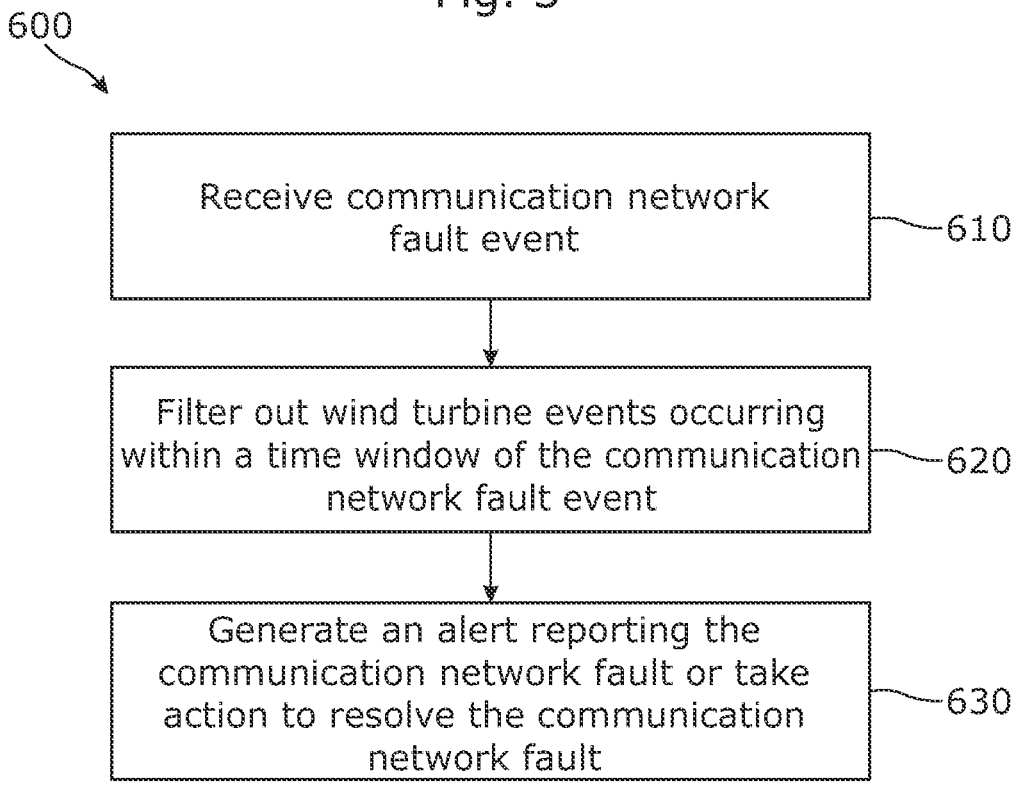
FIG. 6 is a flow chart showing an example method of correlating events.

FIG. 6 is a flow diagram 600 showing a specific example of event correlation. At block 610 the wind park manager receives an IT system event indicating a fault of a communication network. For instance, the fault may be in a network switch or a network link.

At 620 the wind park manager receives, but filters out, wind turbine events occurring within a time window of the communication network fault event. That is the event correlation process assumes that wind turbine events occurring within the time window are due to the network switch fault event. Thus the communication network fault event is deemed to be the root cause of the wind turbine events in the time window. The time window may be any suitable predetermined time window in which the communication network fault event is deemed likely to be the cause of wind turbine events. In one example the time window is one second before or after the communication network fault event. In other examples the time window may only extend to wind turbine events occurring after the communication network fault event.

At 630 the wind park manager takes action to resolve the event or generates an alert indicating that the communication network has a fault. This alert may be reviewed by a system administrator and appropriate action taken.

Figure 7:
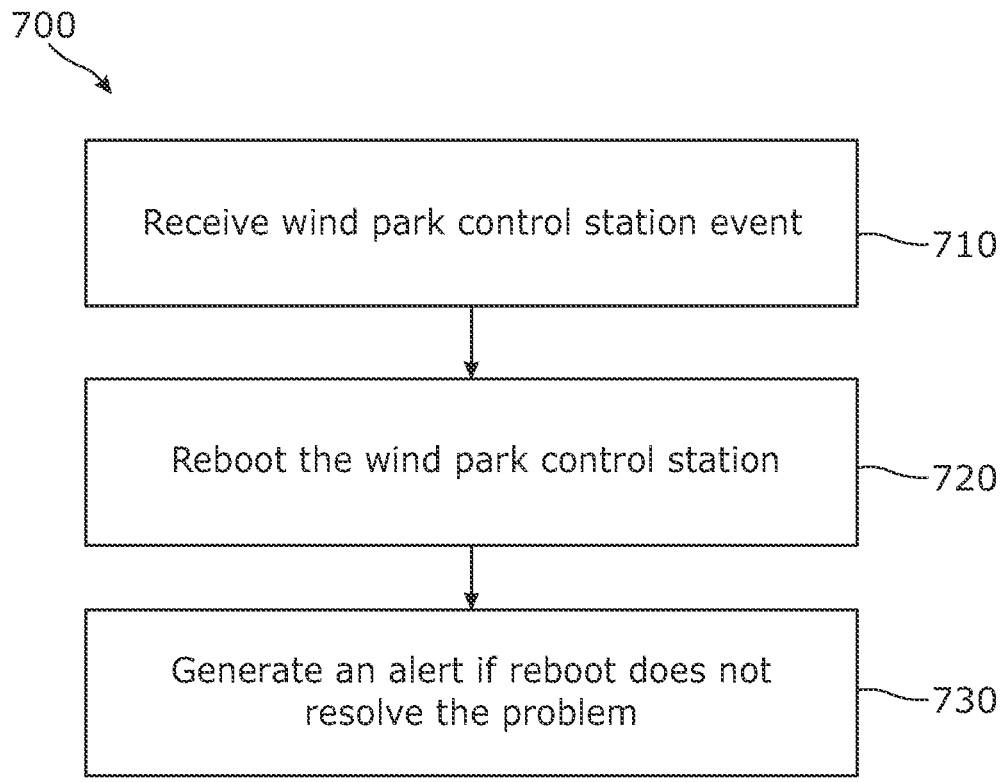
FIG. 7 is a flow chart showing another example method.

Another example is shown in FIG. 7. At block 710 the wind park manager receives a wind park control station event. The wind park control station event may relate to the hardware of the wind park control station, the software of the wind park control station or one of the modules of application software running on the wind park control station. For instance, the wind park manager may detect that a particular software application module is not running on the wind park control station, but should be running in normal operation. This is in contrast to certain conventional approaches in which a remote manager may receive data about wind turbines from a wind park control station, but not monitor whether the wind park control station itself is running normally. Thus in the conventional approach an operator of the wind park manager may think that there is a problem with a wind turbine, when in fact the problem is with the wind park control station.

At block 720 the wind park manager takes action to resolve the wind park control station event. For instance, the wind park manager 400 may instruct rebooting of the wind park control station 210. If the event does not re-occur after rebooting of the wind park control station then the event may be considered to be resolved. If the event re-occurs the wind park manager may attempt to reboot the wind park control station again. In this way the event may be resolved relatively quickly and easily, for example without sending someone to check the wind park control station and wind park. If the event is not resolved after rebooting a certain number of times the wind park manager may proceed to block 730.

At block 730 the wind park manager 400 generates an alert indicating a fault with the wind park control station. In one example, in response to the alert, a person may be dispatched to the wind park to investigate further.

Figure 8:
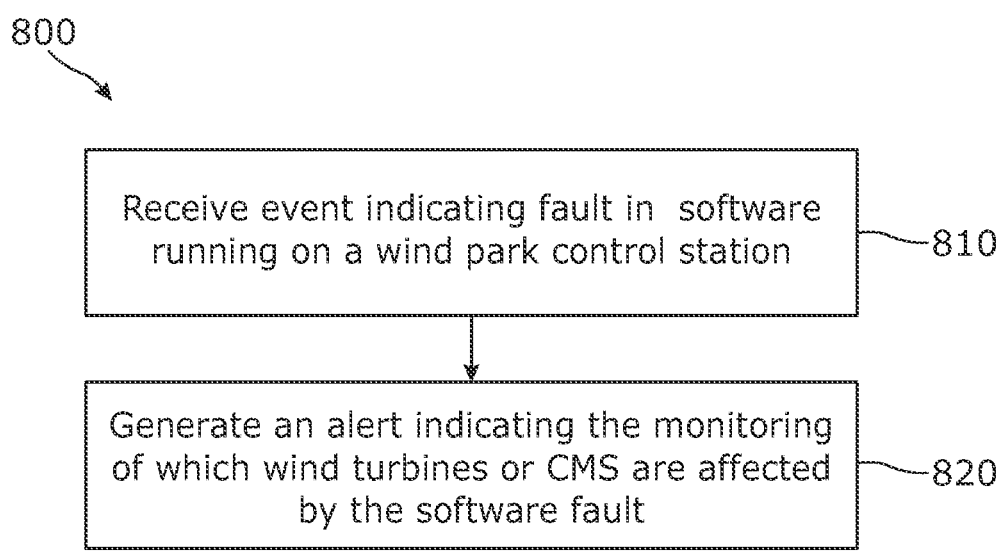
FIG. 8 is a flow chart showing an example method of generating an alert.

FIG. 8 shows another method carried out by the wind park manager 400. At block 810 the wind park manager receives an IT system event indicating a problem with software running on the wind park control station. For example, the event may relate to a particular module of application software hosted by the wind park control station.

At block 820 the wind park manager generates an alert to indicate the monitoring of which wind turbines is affected by the software fault.

The alert may help an operator of the wind park manager 400 to better understand the situation at the wind park. For instance, if there is a fault with software monitoring a plurality of wind turbines then data from those wind turbines may be unavailable to the wind park manager. In another example, if there is a fault with software that gathers data from a particular CMS on one or more wind turbines, then data from the CMS will not be available to the wind park manger. Without monitoring of the alert indicating which CMS or wind turbines had their monitoring affected, the user of the wind park manager would not know why there was no data from the affected CMS or wind turbines.

Figure 9:
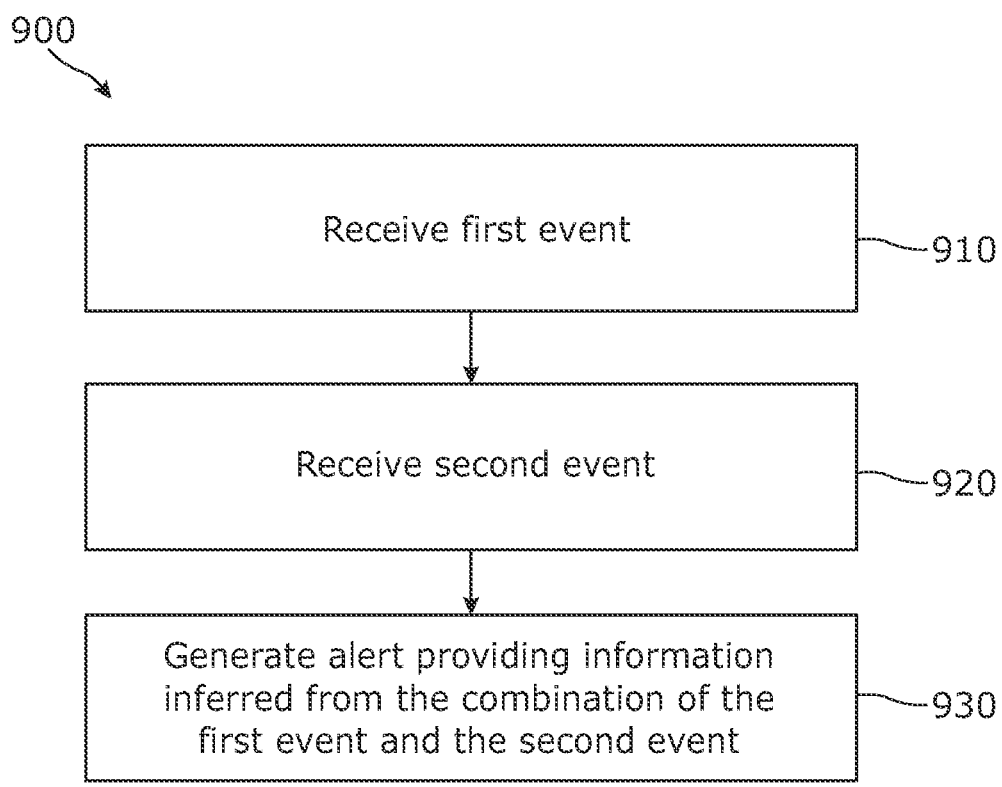
FIG. 9 is a flow chart showing an example method of correlating events.

In another example, shown in FIG. 9, event correlation may involve inferring information from two events. At block 910 the wind park manager receives a first event. At block 920 the wind park manager receives a second event. At block 930 the wind park manager generates an alert providing information inferred from the combination of the first event and the second event. For instance, if the first event is that the rotations per minute (RPM) of the turbine fluctuate rapidly beyond a given threshold and the second event is that the fluctuation of power generated by the wind turbine is above a certain threshold, then the wind park manager may generate a rotor alert indicating that there is a problem with the wind turbine rotor.

Figure 10:
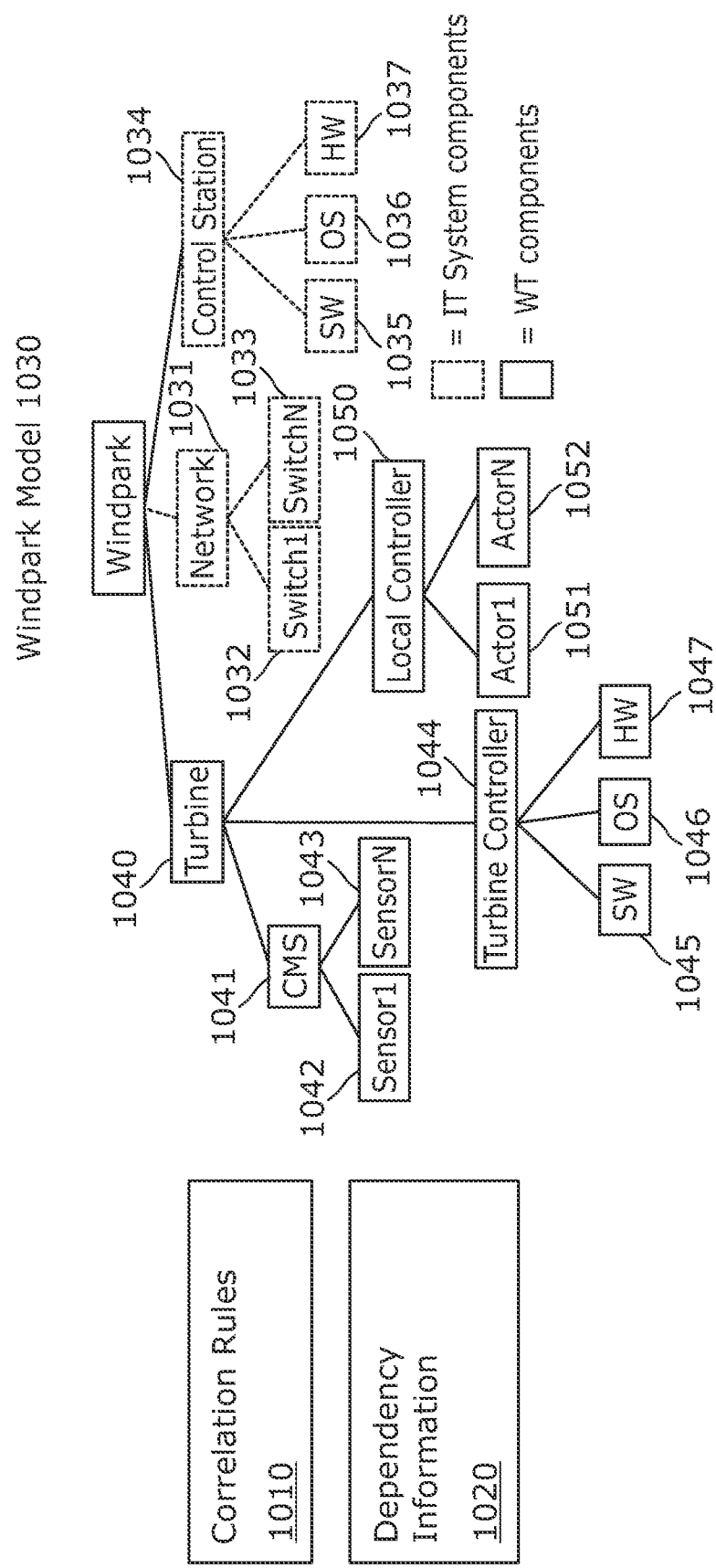
FIG. 10 is a schematic diagram showing an example model of a wind park.

In order to carry out the correlation the wind park manager may include a correlation engine that correlates events based on correlation rules and dependency information indicating dependencies between components. The dependency information may be based on a model of the wind park that includes a representation of each component in the wind park FIG. 10 is a schematic example of a correlation engine that includes correlation rules 1010, dependency information 1020 and a wind park model 1030. The correlation rules are rules that define how IT system events, wind turbine events and/or power grid data may be correlated and what alerts to generate or action to take based on the correlation. The correlation rules may refer to dependency information indicating which components of the wind park are dependent on which other components. For instance any dependencies between turbine controllers, CMS and software applications on the wind park control station or switches in the communication network. The wind park model 1030 may include each component or system in the wind park and may include the dependency information. The wind park model and dependency information may be built from topology information gathered by an agent 490 of the wind park manager. In the illustrated example the wind turbine (WT) components are shaded and include the communication network 1031 that includes switches 1032, 1033; and a wind park control station 1034 that includes various software applications 1035, operating system 1036 and hardware 1037. The model also includes at least one wind turbine 1040 that includes at least one CMS 1041, a local component controller 1050 and a turbine controller 1044. The CMS may include a plurality of sensors 1042, 1043. The turbine controller 1044 may include software 1045, an operating system 1046 and hardware 1047. The local controller for controlling a machine component of the turbine may include actors 1051, 1052 that may be integrated chips and/or machinery to carry out particular control tasks or operations. These various components and their dependency information may be stored in the wind park model 1030.

So far a wind park manager for controlling and/or monitoring a wind park has been disclosed. However, the principles herein have broader application and may be used for controlling or monitoring a factory or other industrial processes. Thus a wind turbine is one example of an automative system, but there any many other examples including machines used in factories, industrial systems, conveyer belts and robotic arms etc. Likewise the wind park control station is one example of a control station for controlling and/or monitoring an automative system.

Figure 11:
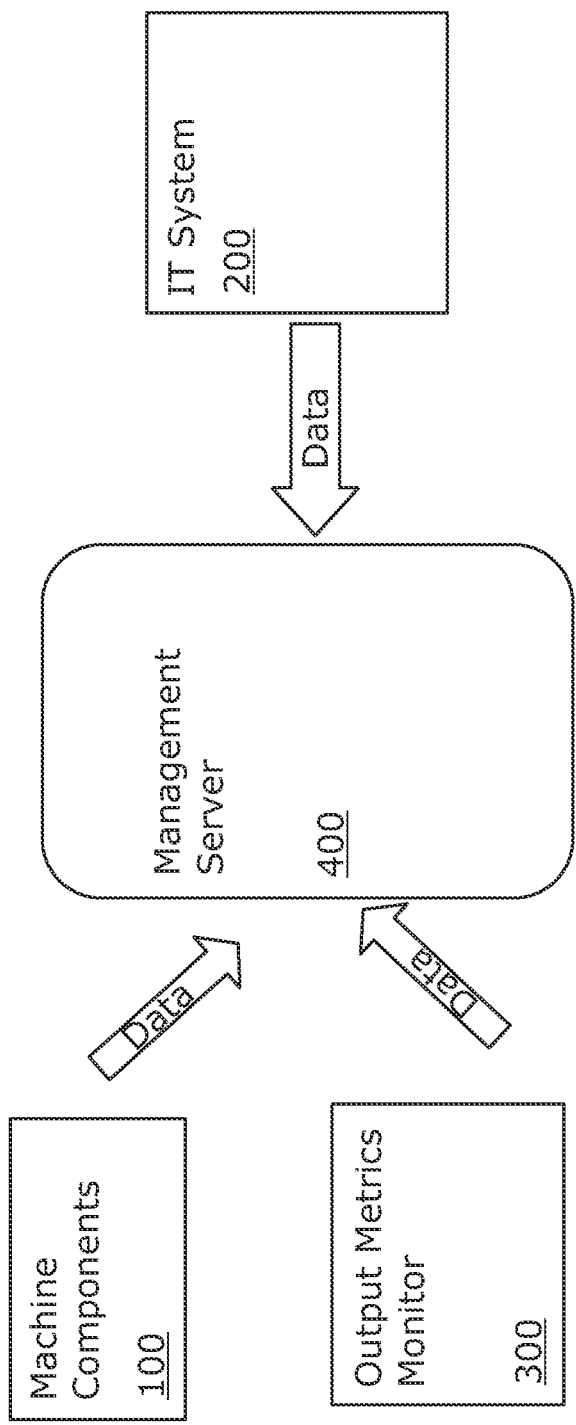
FIG. 11 is a schematic diagram showing an example of a system according to the present disclosure

FIG. 11 is a schematic diagram showing a general example of a system for managing an automative system, in which a management server 400 passively or actively receives data and/or events from machine components 100, an IT system 200, and an output metrics monitor 300.

Figure 12:
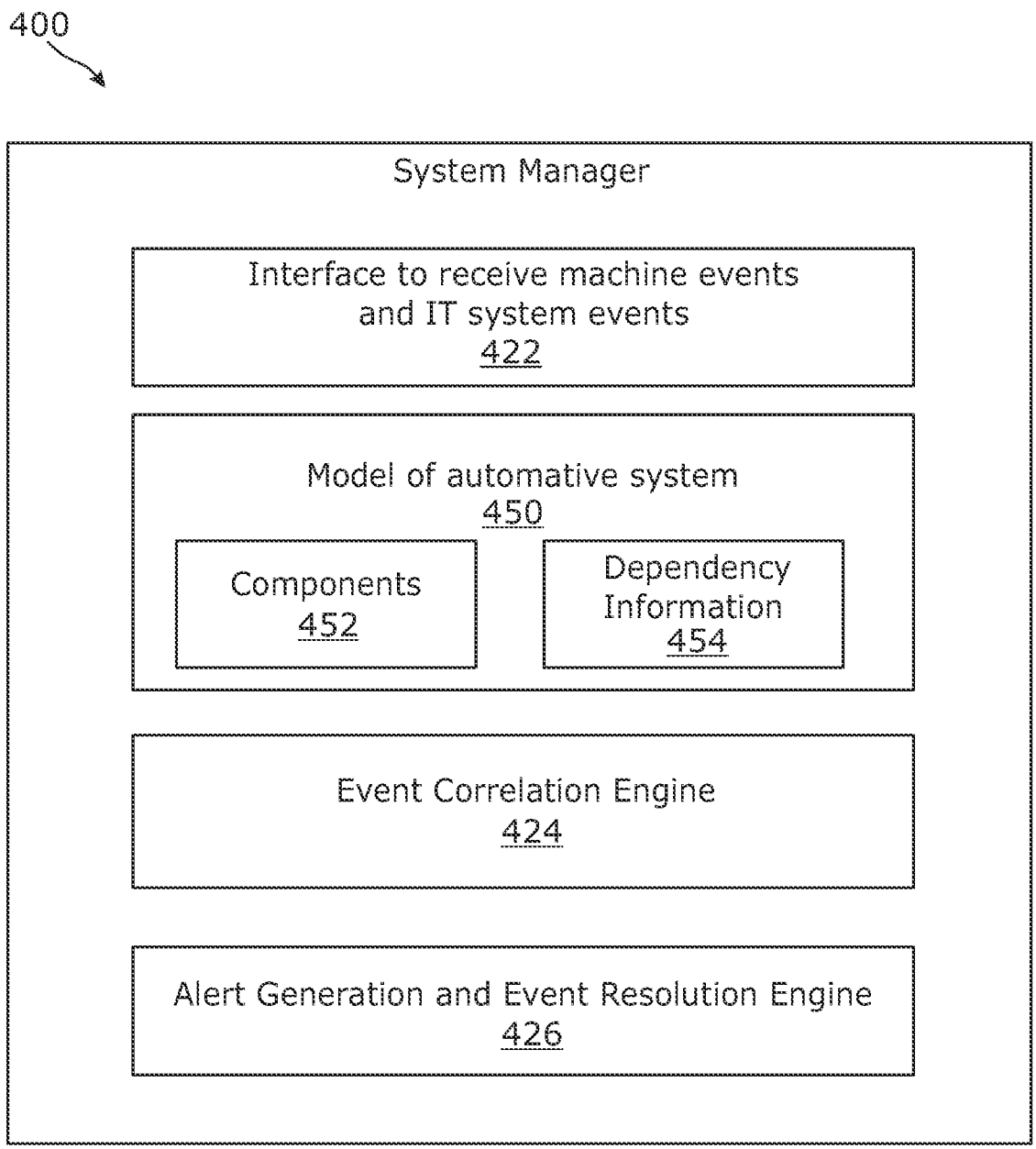
FIG. 12 is a schematic diagram showing an example system manger.

FIG. 12 shows an example of a system manager 400 for managing an automative system. The system manager may for example be a computing device such as a server. The system manager includes hardware components that act alone or in combination with software to receive and correlate events. In one example the system manager is a wind park manager to manage a wind park.

The system manager 400 includes an interface 422 to receive IT system events and machine events, such as wind turbine events or events from other types of machine. The system manager further includes a model of an automative system 450. The model includes IT components and machine components 452, as well as dependency information 454. The dependency information 454 defines dependencies between components.

The system manager also includes an event correlation engine 424. The event correlation engine is to correlate machine events with IT system events. Examples of such correlation have been described above. The event correlation engine may operate according to correlation rules and some of these correlation rules may be based on the model of the automative system 450.

The system manager further includes an alert generation and event resolution engine. This engine is to take action to resolve an event or generate an alert based on the output of the correlation engine. For instance the correlation engine may indicate a root cause of an event and the alert generation and event resolution engine may generate an alert based reporting the root cause of the event. In other examples the engine may instruct rebooting of an IT system component based on the output of the event correlation engine.

Figure 13:
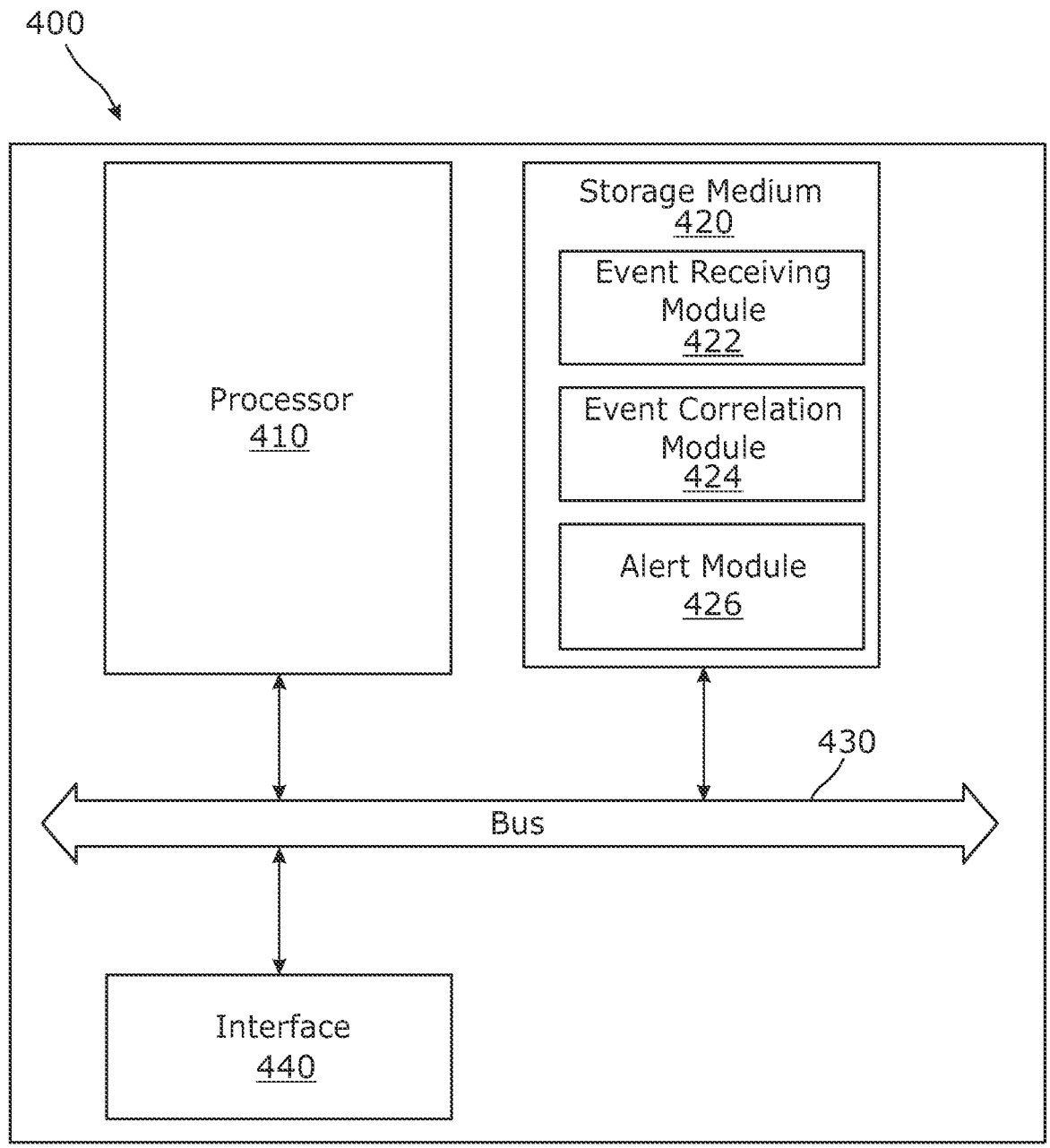
FIG. 13 is a schematic diagram showing an example system manger.

FIG. 13 is a schematic example showing another example of a system manager 400. The system manager may be a computing device such as a server. The system manager includes hardware components that act alone or in combination with software to receive and correlate events. In one example the system manager is a wind park manager to manage a wind park.

The system manager includes a processor 410 and a non-transitory storage medium 420 that stores machine readable instructions that are executable by the processor. The storage medium 420 may for example be a volatile or non-volatile memory or a hard disk etc. The system manager also includes a communication interface 440. The processor 400 and storage medium 420 and interface 440 may be connected by a bus 430 or other communication medium.

The storage medium 420 stores machine readable instructions that are executable by the processor 410. The machine readable instructions may include instructions to carry out any of the processes described herein in relation to the wind park manager or system manager. In the illustrated example, the instructions include an event receiving module to receive IT system and machine events 422, an event correlation module 424 to correlate IT system and machine events and an event resolution and alert module 426 to generate an alert reporting a cause of an event or take action to resolve an event.

Figure 14:
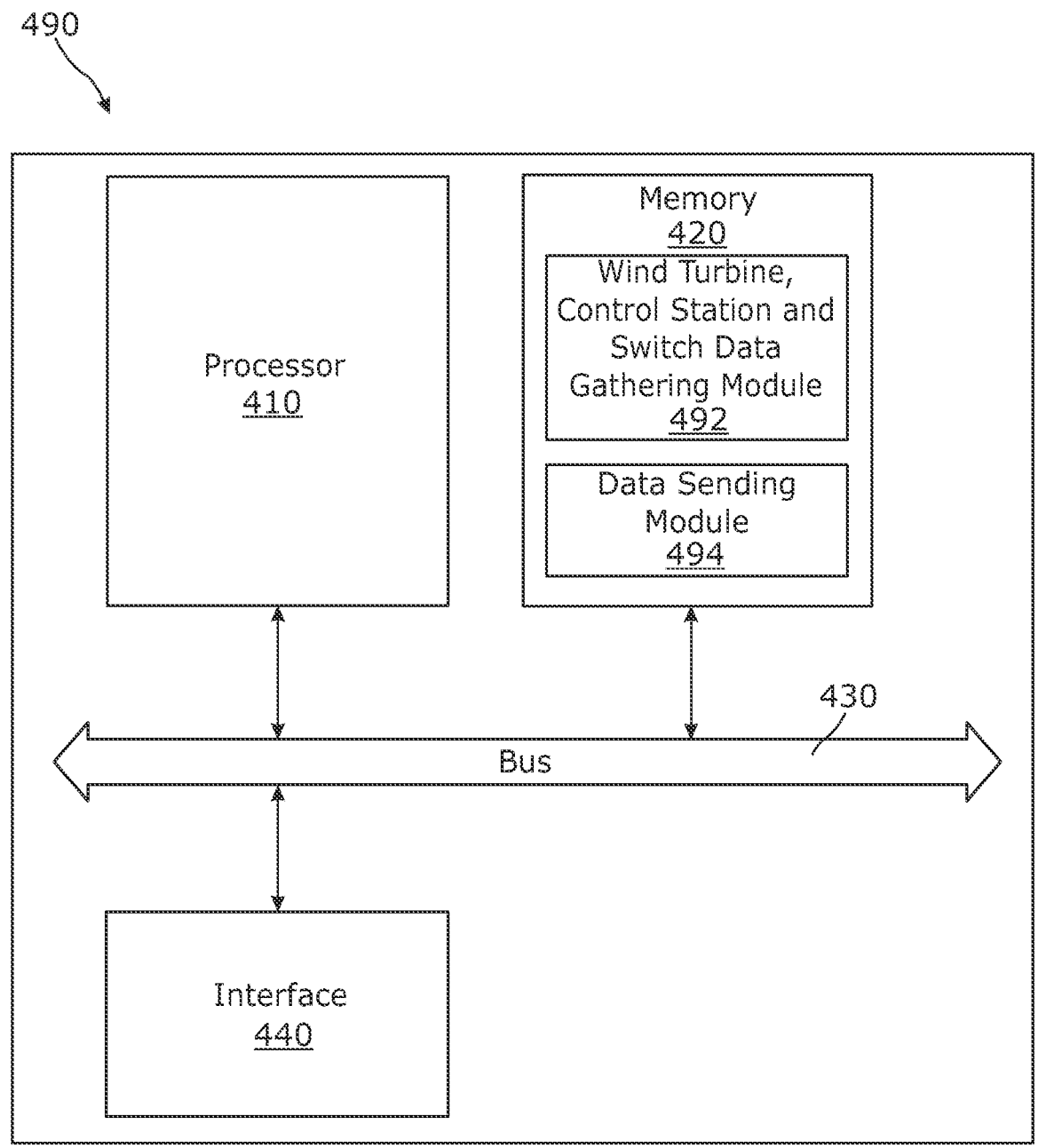
FIG. 14 is a schematic diagram showing an example agent.

FIG. 14 is a schematic diagram showing one example of an agent 490 for a wind park manager. The agent is hosted on a computing device that includes a processor 410 and a non-transitory storage medium 420 that stores machine readable instructions of the agent that are executable by the processor. The storage medium 420 may for example be a volatile or non-volatile memory or a hard disk etc. The system manager also includes a communication interface 440. The processor 400 and storage medium 420 and interface 440 may be connected by a bus 430 or other communication medium.

The machine readable instructions include a wind turbine, wind park control station and switch data gathering module 492 to actively or passively receive data from condition monitoring systems and turbine controllers, a wind park control station and network switches. The agent also includes a data sending module 494 that is to actively send or otherwise make available data gathered by the module 492 to the wind park manager. The agent may include further modules to process the data to translate into a particular format and/or generate events before forwarding to the wind park manager.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A non-transitory computer readable storage medium storing instructions that upon execution cause a computer system to:
   receive information technology (IT) system events and wind turbine events, the wind turbine events relating to operations of a wind turbine, and the IT system events representing faults in an IT system comprising a network and a control station to manage the wind turbine over the network;
   correlate an IT system event of the IT system events with a wind turbine event of the wind turbine events to determine that the IT system event is a cause of the wind turbine event, the correlating being according to a correlation rule based on dependency information among components of the wind turbine and components of the IT system, the dependency information derived from a topology of the wind turbine and the IT system; and
   generate an alert reporting the cause of the wind turbine event or initiate action to resolve the cause of the wind turbine event.

2. The non-transitory computer readable storage medium of claim 1, wherein:
   the wind turbine events include an event reported by a condition monitoring system of the wind turbine, and an event reported by a controller of the wind turbine.

3. The non-transitory computer readable storage medium of claim 1, wherein the instructions to correlate the IT system event with the wind turbine event include instructions to filter out wind turbine events occurring within a time window of the IT system event.

4. The non-transitory computer readable storage medium of claim 1, wherein the instructions upon execution cause the computer system to receive power grid interface data including at least one of electrical voltage, current, power, frequency, or phase generated by the wind turbine, wherein the correlation rule further correlates the power grid interface data with the IT system event and the wind turbine event.

5. The non-transitory computer readable storage medium of claim 1, wherein the IT system event represents a fault of a hardware or software of the control station, and the correlating determines that the fault of the hardware or the software of the control station is the cause of the wind turbine event.

6. The non-transitory computer readable storage medium of claim 1, wherein the IT system event represents a fault of a network component of the network, and the correlating determines that the fault of the network component is the cause of the wind turbine event.

7. The non-transitory computer readable storage medium of claim 1, wherein the wind turbine event indicates a problem with an operation of the wind turbine.

8. The non-transitory computer readable storage medium of claim 1, wherein the instructions upon execution cause the computer system to:
   reboot the control station as part of the action to resolve the cause of the wind turbine event.

9. A computer system comprising:
   a processor; and
   a non-transitory storage medium storing instructions executable on the processor to:
      receive machine events relating to machine components of a wind turbine, and information technology (IT) system events relating to faults of components of an IT system comprising a network and a control station to manage the machine components of the wind turbine over the network;
      correlate an IT system event of the IT system events with a machine event of the machine events according to a correlation rule based on dependency information among the machine components of the wind turbine and the components of the IT system, the dependency information derived from a topology of the wind turbine and the IT system, the correlating to determine that the IT system event is a root cause of the machine event; and
      initiate an action to resolve the machine event based on determining from the correlating that the IT system event is the root cause of the machine event.

10. The computer system of claim 9, wherein the correlation rule includes a rule to filter out machine events caused by the IT system event during a time window of the IT system event.

11. The computer system of claim 9, wherein the machine components comprise a moveable member of the wind turbine, a controller of the wind turbine, and a sensor of the wind turbine.

12. The computer system of claim 9, wherein the instructions are executable on the processor to instruct rebooting of the control station as part of the action to resolve the machine event.

13. The computer system of claim 9, wherein the IT system event represents a fault of a hardware of the control station, and the correlating determines that the fault of the hardware of the control station is the root cause of the machine event.

14. The computer system of claim 9, wherein the IT system event represents a fault of a software of the control station, and the correlating determines that the fault of the software of the control station is the root cause of the machine event.

15. A method performed by a computer system, comprising:
   receiving information technology (IT) system events and wind turbine events, the wind turbine events relating to operations of a wind turbine, and the IT system events representing faults in an IT system comprising a network and a control station to manage the wind turbine over the network;
   correlating an IT system event of the IT system events with a wind turbine event of the wind turbine events to determine that the IT system event is a cause of the wind turbine event, the IT system event representing a fault of the control station, and the correlating being according to a correlation rule based on dependency information among components of the wind turbine and components of the IT system, the dependency information derived from a topology of the wind turbine and the IT system; and
   initiating an action to resolve the wind turbine event based on determining that the IT system event is the cause of the wind turbine event.

16. The method of claim 15, wherein the IT system event represents a fault of a hardware of the control station, and the correlating determines that the fault of the hardware of the control station is the cause of the wind turbine event.

17. The method of claim 15, wherein the IT system event represents a fault of a software of the control station, and the correlating determines that the fault of the software of the control station is the cause of the wind turbine event.

* * * * *